US012285140B2

(12) United States Patent
Armbrister

(10) Patent No.: US 12,285,140 B2
(45) Date of Patent: Apr. 29, 2025

(54) SHOWERHEAD ATTACHMENT AND METHODS OF USE

(71) Applicant: Raymond Armbrister, Fresno, CA (US)

(72) Inventor: Raymond Armbrister, Fresno, CA (US)

( * ) Notice: Subject to any disclaimer, the term of this patent is extended or adjusted under 35 U.S.C. 154(b) by 96 days.

(21) Appl. No.: 18/112,992

(22) Filed: Feb. 22, 2023

(65) Prior Publication Data

US 2024/0277188 A1 Aug. 22, 2024

(51) Int. Cl.

| | |
|---|---|
| ***E03C 1/04*** | (2006.01) |
| ***A46B 5/00*** | (2006.01) |
| ***A46B 7/04*** | (2006.01) |
| ***A46B 9/00*** | (2006.01) |
| ***A46B 11/06*** | (2006.01) |
| ***A47K 3/28*** | (2006.01) |
| ***B08B 1/12*** | (2024.01) |
| ***B08B 3/02*** | (2006.01) |
| ***E03C 1/02*** | (2006.01) |

(52) U.S. Cl.

CPC .............. *A47K 3/281* (2013.01); *A46B 5/005* (2013.01); *A46B 7/046* (2013.01); *A46B 9/005* (2013.01); *A46B 11/063* (2013.01); *B08B 1/12* (2024.01); *B08B 3/026* (2013.01); *E03C 1/021* (2013.01); *E03C 1/0409* (2013.01); *A46B 2200/3033* (2013.01); *A46B 2200/3093* (2013.01)

(58) Field of Classification Search

CPC ..... E03C 1/0409; E03C 1/0412; A47K 3/281; B08B 1/12; B08B 3/026; A46B 5/005

USPC .............................................................. 4/606

See application file for complete search history.

(56) References Cited

U.S. PATENT DOCUMENTS

| | | | |
|---|---|---|---|
| 5,500,972 | A | 3/1996 | Foster |
| D369,026 | S | 4/1996 | Furbert et al. |
| 6,338,170 | B1 | 1/2002 | De Simone |
| 7,988,070 | B1 | 8/2011 | Yang et al. |
| 8,308,085 | B2 | 11/2012 | Meisner et al. |
| 8,985,886 | B1 | 3/2015 | Derrick |
| 9,049,976 | B2 | 6/2015 | Blocker |
| 9,326,484 | B2 | 5/2016 | Allen |
| 9,326,655 | B2 | 5/2016 | Call |
| 9,643,195 | B2 | 5/2017 | Streetmaker |
| 9,829,116 | B2 | 11/2017 | Xu et al. |
| D817,645 | S | 5/2018 | Szymanski et al. |
| D821,758 | S | 7/2018 | Szymanski et al. |
| D828,694 | S | 9/2018 | Woodard et al. |

(Continued)

FOREIGN PATENT DOCUMENTS

WO 2019119921 A1 6/2019

*Primary Examiner* — Huyen D Le

(74) *Attorney, Agent, or Firm* — Sierra IP Law, PC; Mark D. Miller

(57) ABSTRACT

A shower brush system that includes an elongated body and an angularly adjustable showerhead with a combination cleaning surface and water dispersal system. The showerhead can be adjusted to clean the body or the bathing facility. Embodiments of the showerhead may include a removable insert that allows the user to choose from various brush heads or cleaning surfaces designed for different applications. These inserts can be removed, replaced, or disposed of when necessary. The shower brush systems of the present invention provide versatile and customizable cleaning solutions for users of and in a tub or shower.

12 Claims, 14 Drawing Sheets

(56) References Cited

U.S. PATENT DOCUMENTS

| | | | | |
|---|---|---|---|---|
| 10,179,337 | B2 | 1/2019 | Lin et al. | |
| 10,207,280 | B2 | 2/2019 | Lin et al. | |
| D854,654 | S * | 7/2019 | Peterson | D6/524 |
| 10,441,960 | B2 | 10/2019 | Rogers et al. | |
| 10,660,429 | B2 | 5/2020 | Quinn et al. | |
| 10,722,906 | B2 | 7/2020 | Huang et al. | |
| 10,750,849 | B2 | 8/2020 | Woodard et al. | |
| D898,374 | S | 10/2020 | Quinn et al. | |
| 10,946,394 | B2 | 3/2021 | Hu et al. | |
| 10,968,612 | B1 * | 4/2021 | Tzeng | E03C 1/0408 |
| 11,371,180 | B2 | 6/2022 | Carpenter et al. | |
| 11,458,488 | B2 | 10/2022 | Rogers et al. | |
| 2005/0125890 | A1 * | 6/2005 | Zhadanov | A46B 11/063 4/615 |
| 2006/0102747 | A1 | 5/2006 | Ho | |
| 2006/0248666 | A1 | 11/2006 | Lies | |
| 2012/0165710 | A1 | 6/2012 | Nichos | |
| 2016/0088927 | A1 * | 3/2016 | Knight | B25G 1/04 15/4 |
| 2016/0279648 | A1 * | 9/2016 | Hawkins | E03C 1/0409 |
| 2017/0314240 | A1 * | 11/2017 | Culmer | B05B 1/1636 |
| 2018/0298596 | A1 * | 10/2018 | Tsai | E03C 1/0408 |
| 2019/0142147 | A1 * | 5/2019 | Quinn | A46B 11/066 4/606 |
| 2023/0175240 | A1 * | 6/2023 | Yan | E03C 1/0408 239/281 |

* cited by examiner

SHOWERHEAD ATTACHMENT AND METHODS OF USE

FIELD OF THE INVENTION

The present invention relates generally to adjustable showerhead brushes and methods of using the same. More particularly, the present invention provides adjustable showerheads with brushes that are operable to receive and secure a plurality of different brush inserts that are removable and replaceable and that may include a telescopic arm in the body of the showerhead assembly that is operable to configure the length of the showerhead for ease of use by physically limited persons.

BACKGROUND OF THE INVENTION

A showerhead is a plumbing fixture that is attached to the water supply of a shower or bathtub. Its main function is distributing water evenly and efficiently over the bather's body during a shower or bath. A showerhead is typically made up of several parts, including a nozzle, a flow restrictor, a handle or knob, and a connection to the water supply. The nozzle is the most important part of the showerhead, as it determines the pattern, intensity, and direction of the water flow. When the bather turns on the shower, water from the supply flows through the showerhead body and into the nozzle. Inside the nozzle, the water is directed through a small opening, which creates a high-pressure stream of water. The shape and size of the opening, as well as the angle and orientation of the nozzle, determine the pattern and direction of the water flow. A flow restrictor is an important part of the showerhead that controls the amount of water that is released from the nozzle. This is important for water conservation and to ensure that the bather receives a consistent water pressure. The restrictor is typically a small plastic disc with a hole in the center, which slows down the water flow and reduces the overall water usage. A handle or knob on the showerhead may control the flow of water from the nozzle. When the handle is turned, a valve inside the showerhead opens or closes, allowing more or less water to flow through the nozzle. Overall, a showerhead is a relatively simple but essential device that makes showering and bathing more efficient and enjoyable. Its design and operation depend on a variety of factors, including the size and shape of the nozzle, the flow rate of the water supply, and the bather's preferences.

However, bathing presents various challenges to the elderly and individuals with injuries to the hands, arms, shoulders, back or spine. For example, persons with fused spine or back injuries may have limited mobility, making it difficult to reach certain areas of their body during bathing. This may result in incomplete cleaning, which can lead to hygiene problems and discomfort. The process of bathing can be painful and uncomfortable for individuals with physical limitations or injuries. Pain can be caused by the pressure of sitting or standing for extended periods of time, or by the twisting and turning movements required during bathing. Individuals may also have balance and stability issues, which can make it difficult for them to stand or sit in the shower or bathtub without the risk of falling or slipping. Many bathrooms are not designed to accommodate individuals with disabilities, which can make it difficult for individuals with physical limitations or injuries to access and use the shower or bathtub. For example, the shower may be too high, or the bathtub may have high walls, making it difficult to get in and out. Individuals with physical limitations or injuries may require special equipment, such as shower chairs or transfer benches, brushes, and detachable showerheads to assist with bathing. The limited mobility, pain, discomfort, and accessibility issues provide challenges to bathing and cleaning the shower. It is advantages to provide a bathing apparatus that provides water and a scrubbing surface for persons having physical limitations.

SUMMARY OF THE INVENTION

The present invention provides adjustable scrubbing showerhead and brush assemblies that provide a scrubbing surface and a water delivery system that is operable to interface between a fixed showerhead and a water outlet. The showerhead and brush assemblies of the present invention may include a scrubbing surface that is removable, replaceable, and configured with various scrubbing surfaces and nozzle configurations aimed toward bathing or cleaning.

In embodiments of the present invention, the showerhead and brush assembly may provides a shower brush that may include a main body and an interior water conduit that is operable to nest a telescopic pipe that has a concentric watertight seal at an end between the conduit and telescopic pipe interface. The telescopic pipe may have a handle at the base that may be in fluid communication with a hose that connects to a "T" pipe positioned between a fixed showerhead and a water outlet pipe. The "T" pipe may have a valve that provides fluid from the water outlet pipe to the fixed showerhead and to the hose and may be operable to bypass a fixed showerhead to provide fluid to the shower brush. The main body may have a showerhead that is fluid communication and is pivotally secured. The showerhead may have a shell body with a water passageway at a base and an open face with a concentric fastening mechanism that is operable to secure a brush insert. The brush insert may secure to the showerhead and provide a fluid-tight seal around the circumference of the interface. The brush insert may have a scrubbing surface and a plurality of different nozzles for spraying water out of the showerhead.

In some embodiments, the shower brush may be configured for self-washing a person's body and may have a brush insert with high-pressure nozzles to provide a constant stream of fluid and a scrubbing surface that is comfortable for usage on the skin. In such embodiments, the "T" pipe may include a showerhead end conduit, water outlet conduit, water hose conduit, and a three-way valve for diverting fluid to the shower brush and the fixed showerhead. The scrubbing surface may include a plurality of bristles distributed around the nozzles along the outer face of the brush insert. The insert may have a plurality of circumferential grooves that are operable to interface with axially positioned posts along the interior surface of the showerhead shell body. The brush insert may include a lip having an O-ring that is operable to provide a watertight seal with the showerhead body. In such embodiments, the showerhead may have a substantial planer configuration, and the telescopic member may be in the nest (e.g., retracted) position providing a limited extension length for reaching an awkward location on a person's back.

In some embodiments, the shower brush may be configured for washing a bathing facility and may have a brush insert with an abrasive surface and have at least one nozzle for distributing water to the washing surface. In such embodiments, the "T" pipe may have a valve configured to divert fluid to only the shower brush, preventing water from soaking a person cleaning a bathing surface. The shower brush may be configured in the extended position, and the showerhead may be angularly adjusted along the pivot point and locked at an acute angle such that a user is comfortably positioned when cleaning the ground of a shower. In some embodiments, the brush insert may have a polygon shape that provides a user with points for reaching and cleaning tight corners and an abrasive scrubbing surface and may have at least one nozzle.

In some embodiments, the “T” pipe may have a receiver for securing the main body of the shower brush, for example, not limiting, the “T” pipe may have a crescent-shaped receiver that is operable to secure the main body of the shower brush, a pair of magnets, a post and groove.

In some embodiments, the handle may have an ergonomic geometry complementary to a person’s hand and may be used to adjust the length of the telescopic pipe by pulling the base handle away from the main body. In other embodiments, the handle may have a guard that can be used for hooking the shower brush to a wall or mount.

In some embodiments, the handle may have a button that includes a valve that is operable to disengage the flow of water through the main body and the showerhead.

It is an aspect of the present invention to provide a showerhead attachment apparatus incorporated into a fixed showerhead, the apparatus may include: a “T” junction operable to interface between a main water pipe and a showerhead and having a lower hose connector, a main handle having a conduit operable to receive fluid tight telescopic water pipe that may be fixed to a lower handle that has a connector for receiving a hose; a showerhead pivotally secured to the main handle; and a locking interface secured to the showerhead and main handle that is operable to secure the showerhead at a fixed angle with respect to the main handle, the lower handle may be fixed to the fluid-tight telescopic water pipe, and the distance between the lower handle and the main handle may be adjustable and configurable to a desired length. The main handle conduit may be a fluid channel operable to route fluid to the showerhead. The showerhead may include a removable brush insert that has a cleaning surface and a plurality of nozzles. The showerhead may have an interior cavity, water outlet, and a plurality of wedges. The removable brush insert may include a plurality of concentric channels around the exterior surface of the removable brush that may be operable to align and secure to the showerhead. The removable brush insert may have a fluid-tight seal when securing to the showerhead. The removable brush insert may include a plurality of bristles distributed on an exterior face and around the plurality of nozzles. The cleaning surface may be substantially triangular and has at least one nozzle for spraying fluid and scrubbing a surface. The adjustable distance may range from about 14 inches to about 30 inches from the base of the lower handle to a center of the showerhead.

It is a another aspect of the present invention to provide a method for switching a shower attachment from a hygienic care configuration to a tile scrubbing configuration, the method may include: providing a showerhead that may attached to a handle pivotally, where the handle may have a conduit and a concentric telescopic tube that may be operable to extend and retract in the main handle; a hose may be in communication with the telescopic tube and may be operable to route fluid from a fluid outlet to the showerhead; and a brush insert attachment operable to secure to the showerhead, the brush insert attachment may be removed and replaced and secures to said showerhead with a concentric fastening mechanism. The showerhead may be pivotally attached to the handle and operable to be lock at an angle (e.g., acute angle) with a locking switch. The shower attachment may be configured in a hygienic care configuration that positions the concentric telescopic at a retracted position and the showerhead substantially parallel to the center line of the handle. The showerhead includes a brush insert attachment that may include a plurality of nozzles and soft bristles for hygiene care. The shower attachment may be configured in a tile scrubbing configuration with the concentric telescopic tube positioned at an extended length and the showerhead is positioned at a substantially acute angle with the center line of the handle. The showerhead may include a brush insert attachment with a substantially triangular shape and a highly abrasive material operable to clean tile. The hose may be in communication with a three-way valve that has a crescent-shaped receiver for docking the handle. The fastening mechanism may have threading provided to the exterior of the brush insert and an interior of the showerhead for securing the brush insert to the showerhead.

It is another aspect of the present invention to provide an adjustable showerhead device, that may include: a handheld brush including a main body that has an extendable and retractable telescopic member and has a lower handle connecting the telescopic member to a hose, a showerhead that may be angularly adjustable and attached to a top end of the main body, a “T” junction that may be operable to route fluid from a main pipe to the telescopic member, and a brush insert operable to secure to the showerhead, the brush insert includes at least one nozzle and a scrubbing surface, the brush insert may be removable and replaceable and may be operable to configure the handheld brush for hygienic cleaning or tile scrubbing. The brush insert may be removable and replaceable with a plurality of different brush inserts for cleaning various surfaces. The handheld shower brush may be extended to a maximum length and the showerhead may be angularly adjusted to an acute angle, and the at least one nozzle may provide water for cleaning a tile surface.

Further aspects and embodiments will be apparent to those having skill in the art from the description and disclosure provided herein.

It is an object of the present invention to provide an adjustable showerhead device that is operable to have a length configured and a removable and replaceable showerhead that has an angular adjustment that provides persons with physical limitations the ability to bath different regions of their body and the configurability to clean a bathing facility.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Figure 1:
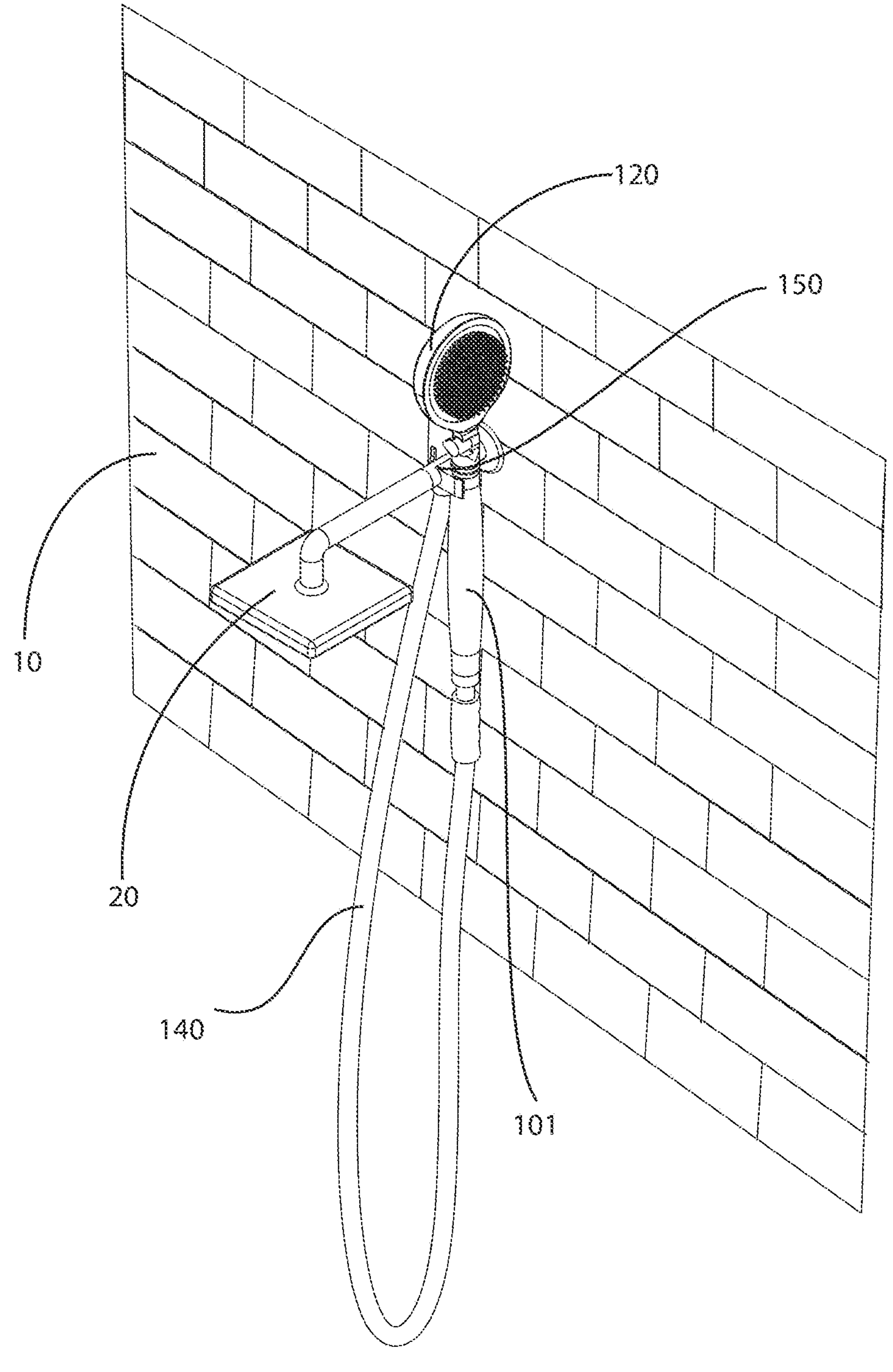
FIG. 1 provides an environmental perspective view of an adjustable showerhead attachment incorporated into a fixed showerhead, according to an embodiment of the present invention.
Figure 2:
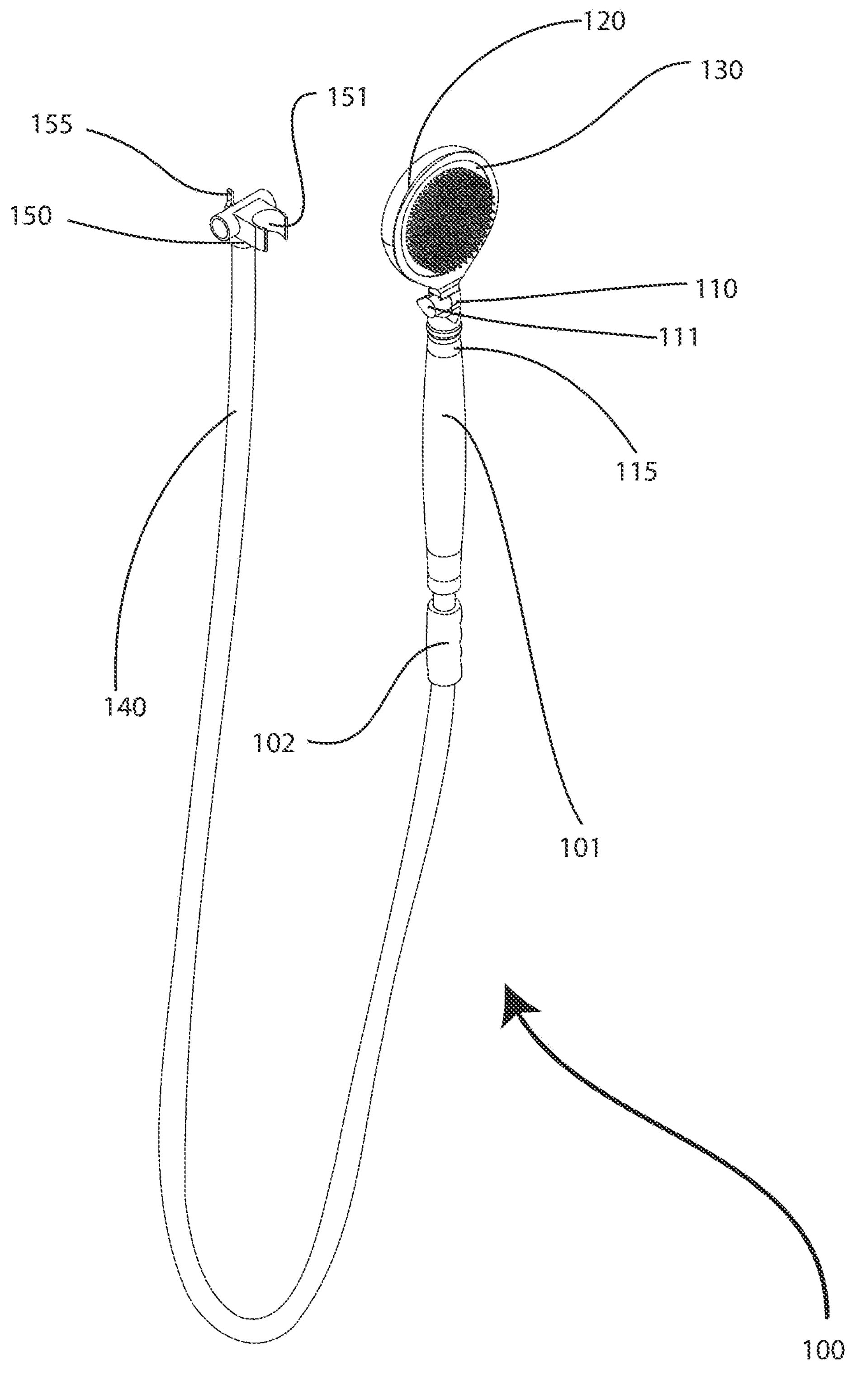
FIG. 2 provides a perspective view of an adjustable showerhead attachment assembly, according to an embodiment of the present invention.
Figure 3:
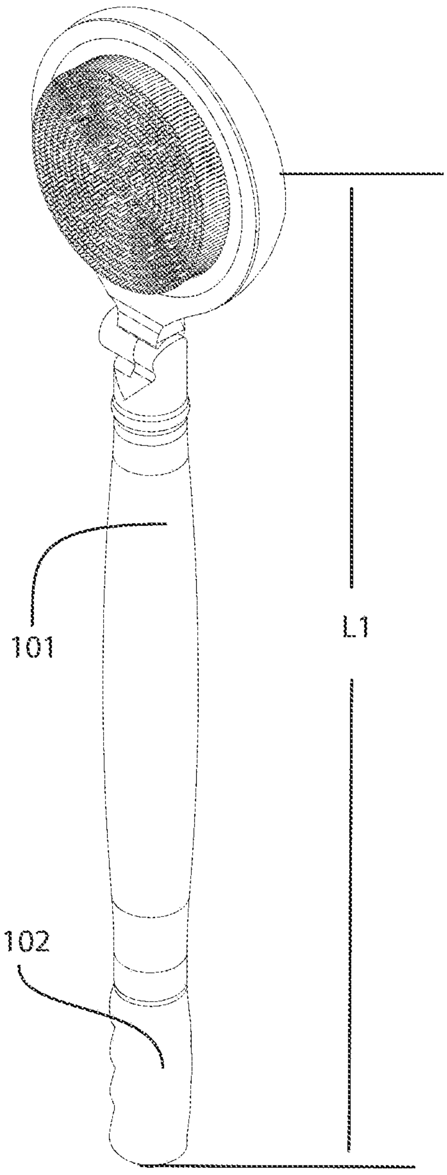
FIG. 3 provides a perspective view of an adjustable showerhead attachment in a collapsed configuration, according to an embodiment of the present invention.
Figure 4:
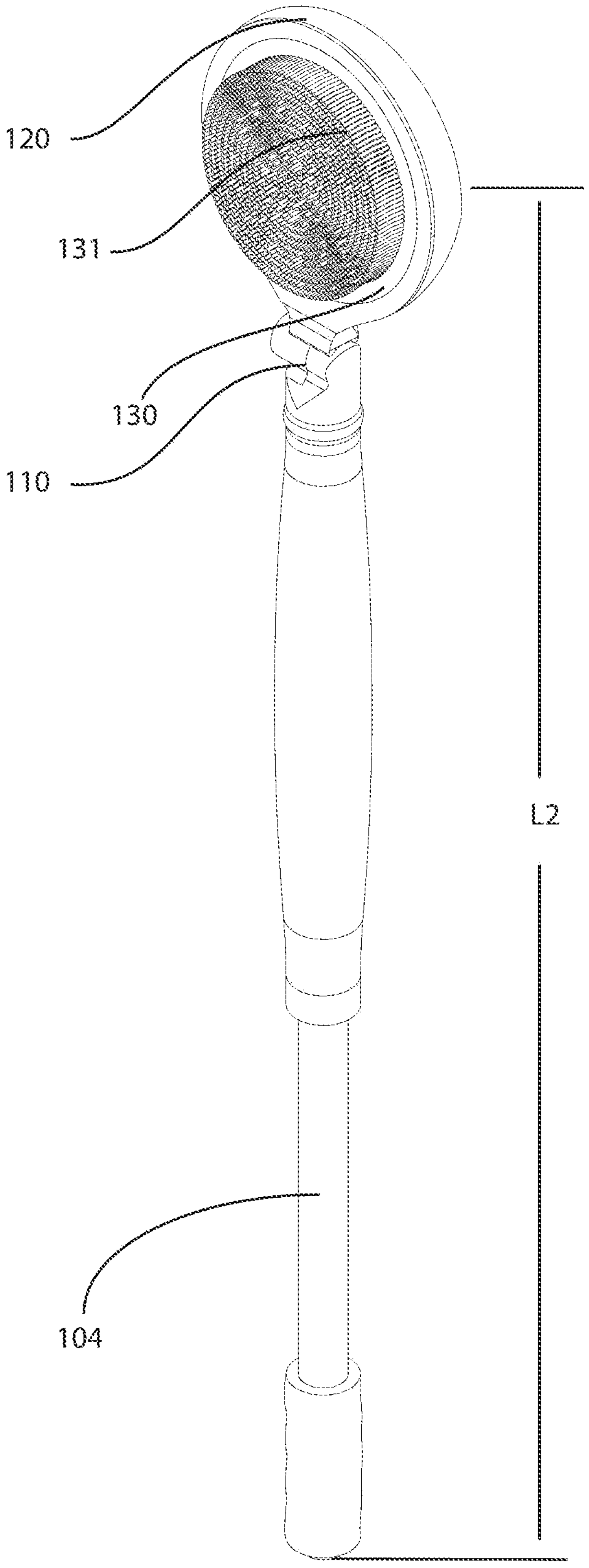
FIG. 4 provides a perspective view of an adjustable showerhead attachment in an extended configuration, according to an embodiment of the present invention.
Figure 5:
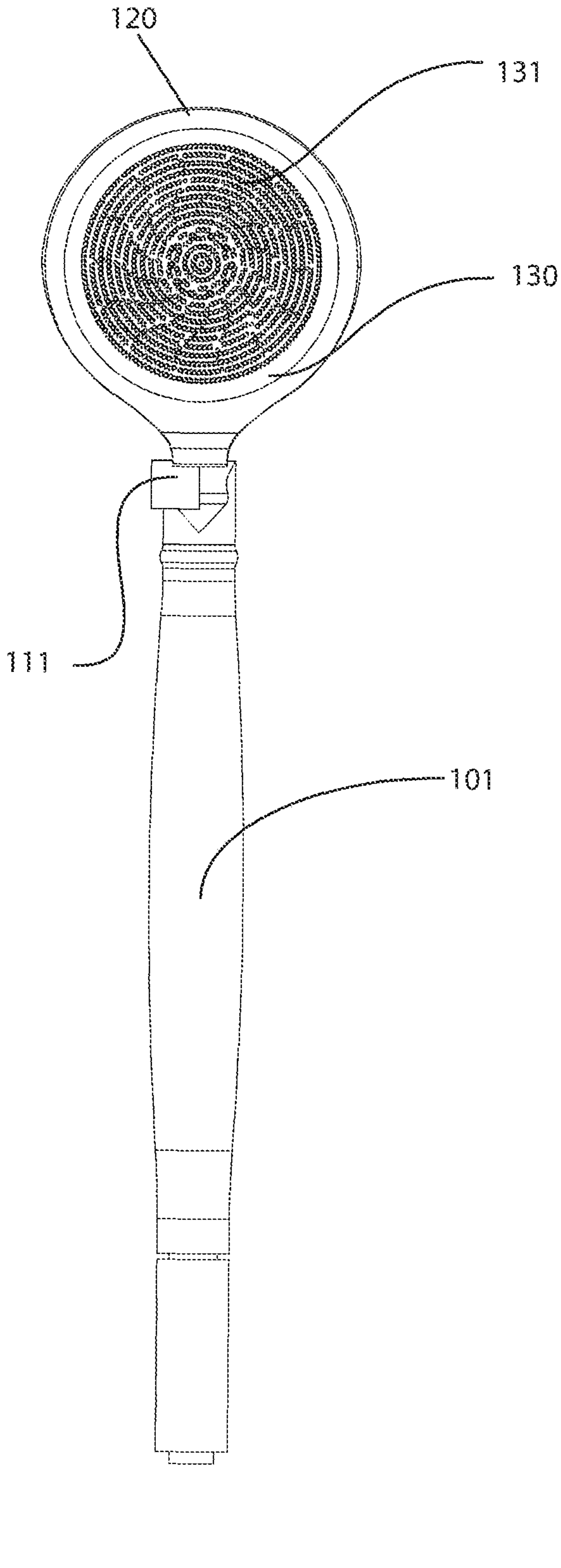
FIG. 5 provides a front view of an adjustable showerhead attachment, according to an embodiment of the present invention.
Figure 6:
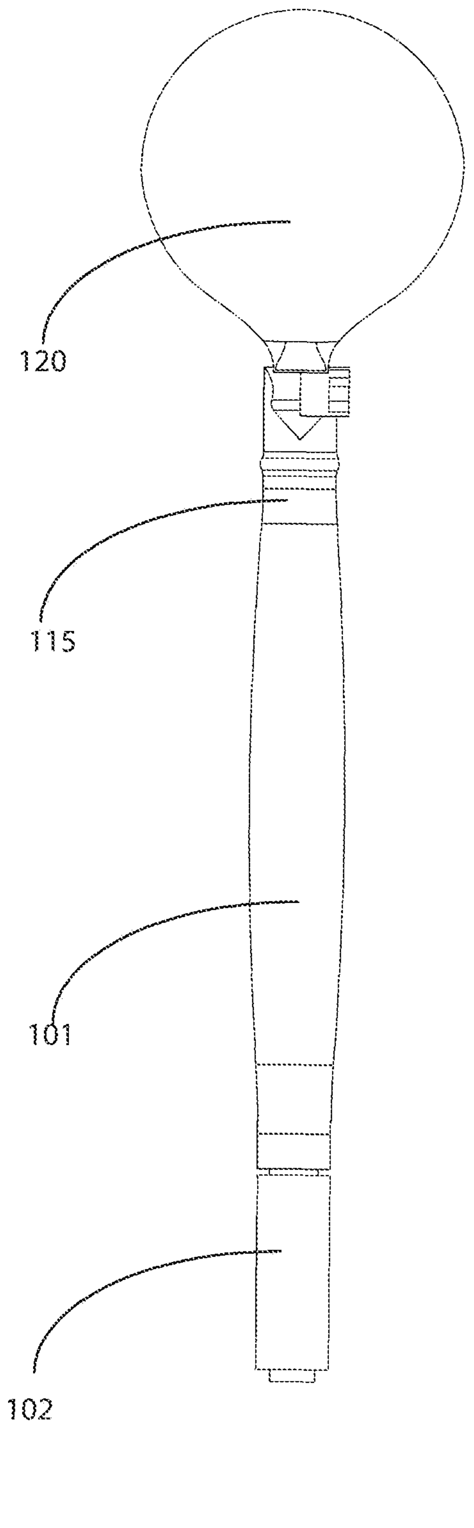
FIG. 6 provides a rear view of an adjustable showerhead attachment, according to an embodiment of the present invention.
Figure 7:
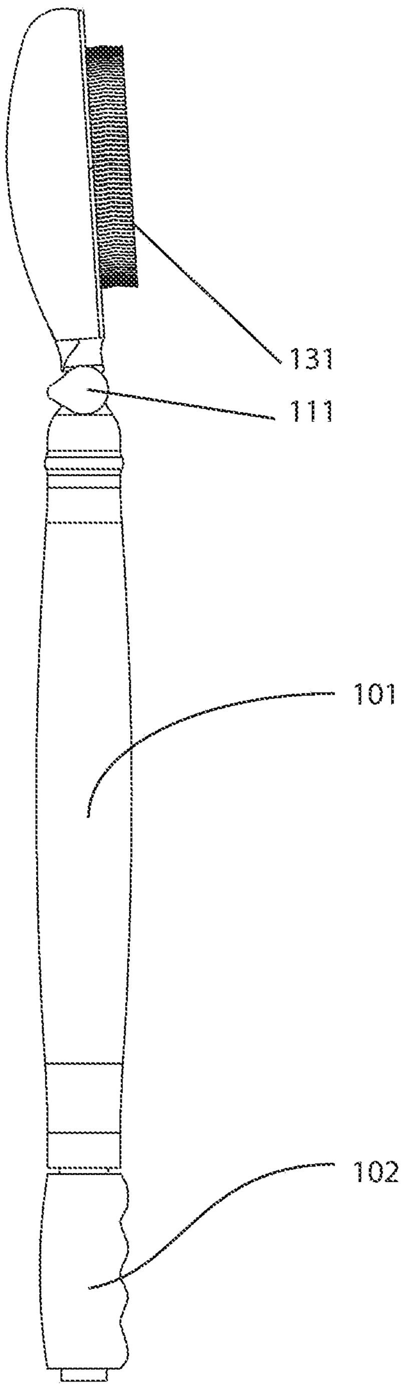
FIG. 7 provides a first side view of an adjustable showerhead attachment, according to an embodiment of the present invention.
Figure 8:
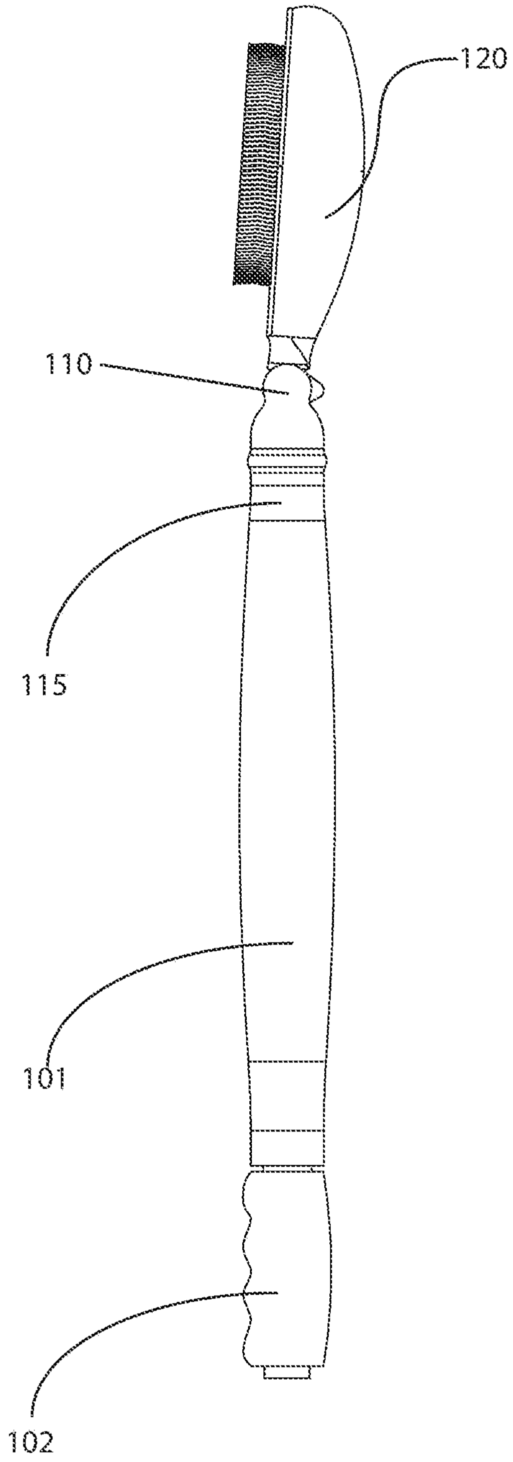
FIG. 8 provides a second side view of an adjustable showerhead attachment, according to an embodiment of the present invention.
Figure 9:
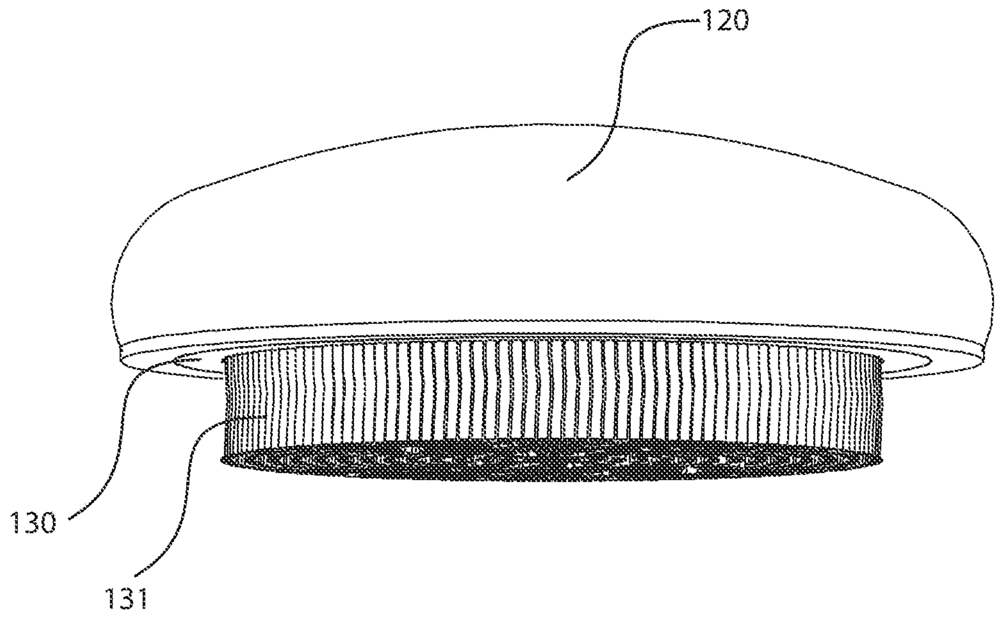
FIG. 9 provides a top view of an adjustable showerhead attachment, according to an embodiment of the present invention.
Figure 10:
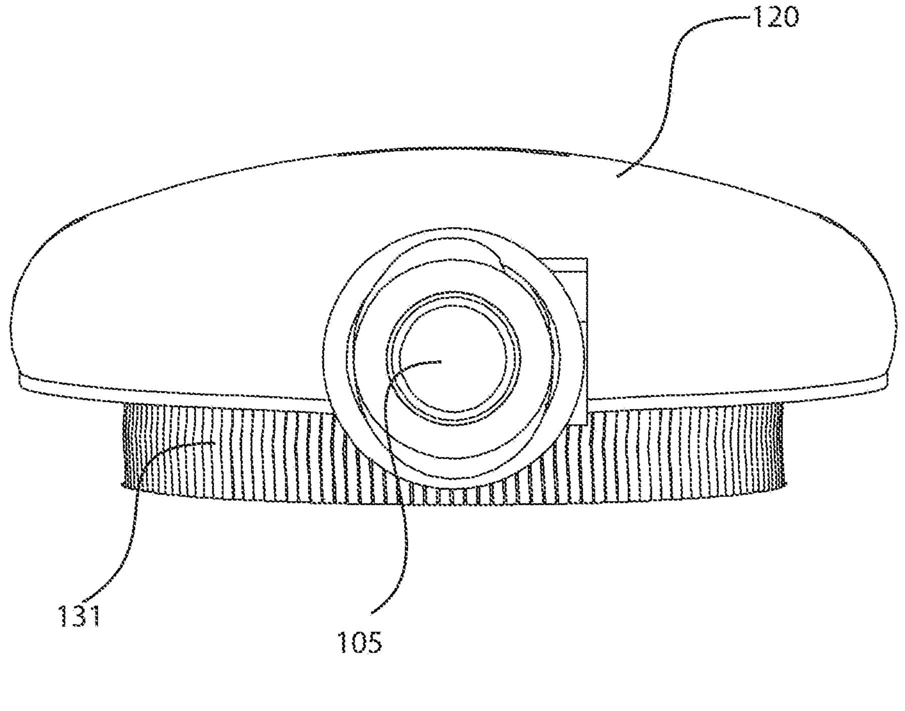
FIG. 10 provides a bottom view of an adjustable showerhead attachment, according to an embodiment of the present invention.

The present invention concerns a showerhead attachment system that is incorporated into a fixed showerhead. FIGS. 1-20 provide views of an adjustable showerhead attachment 100 incorporated into a fixed showerhead 20 and a wall 10. As shown in FIGS. 2-4, the exemplary illustrated showerhead attachment 100 may include a main handle 101 and a lower handle 102 having an internal conduit or passageway 105 therethrough. Lower handle 102 is secured to the base of a telescoping member 104 that has a fluid tight interface with internal conduit of the main handle 101. A swivel 110 may be provided at a top end of the main handle 101 that connects a head 120 to the main handle 101. The head 120 may be operable to receive a plurality of different showerhead inserts 130. An exemplary showerhead insert 130 may have a plurality of water nozzles 132 and a plurality of bristles 131. One end of a hose 140 is attached at the base of the lower handle 102. In some embodiments, the other end of hose 140 may be attached directly to a showerhead output pipe. In other embodiments, hose 140 may be connected to a "T" junction 150 that is positioned between the shower wall 10 and a fixed showerhead 20 as shown in FIG. 1. The "T" junction 150 may have a C shaped receiver for securing a tapered surface 115 of the main body 101 to the shower fixed showerhead 120 and "T" junction interface 150. In some embodiments, the showerhead 120 may be connected to the main handle 101 at a swivel 110 that may be angularly adjusted with a locking switch 111.

Some embodiments, such as those shown in FIGS. 3-10, provide various views of the exemplary showerhead attachment 100 without a T-junction 150, fixed showerhead 20, and water hose 140. FIG. 3 and FIG. 4 provide a comparison of the showerhead attachment 100 in the retracted configuration (FIG. 3) and the elongated configuration (FIG. 4). In such embodiments, the retracted configuration may have a showerhead 120 with a distance L1 from the base of the lower handle 102 that is operable to extend to a maximum length L2. The lower handle 102 may be fixed to the elongating pipe 104 and the elongating pipe 104 and the interior conduit of the main handle 101 may be fluid tight and have the position of the lower handle and the main handle 101 may be adjustable with and secured with a friction fit between the elongating pipe 104 and the interior conduit 105 of the main handle 101. By way of example and without limitation, the length L1 of a retracted configuration may range from about 14 inches to about 18 inches. By way of example and without limitation, the length L2 of an elongated configuration may range from about 26 inches to about 30 inches.

In some embodiments, the showerhead inserts 130 may be removable from the showerhead 120 and may be replaced when desired, such as, for example, when the effectiveness of the cleaning surface and bristles 131 have an unpleasant odor, are worn and torn, are unhygienic, etc. In such embodiments, the showerhead inserts 130 may have various brush styles 131, nozzle 137 configurations, and geometries. In some embodiments. It is to be appreciated that in different embodiments of the invention, a multitude of different combinations of these elements (insert sizes, shapes, geometries, brush styles, nozzle configurations, etc.) may be provided, and all are within the scope of the invention.

Figure 12:
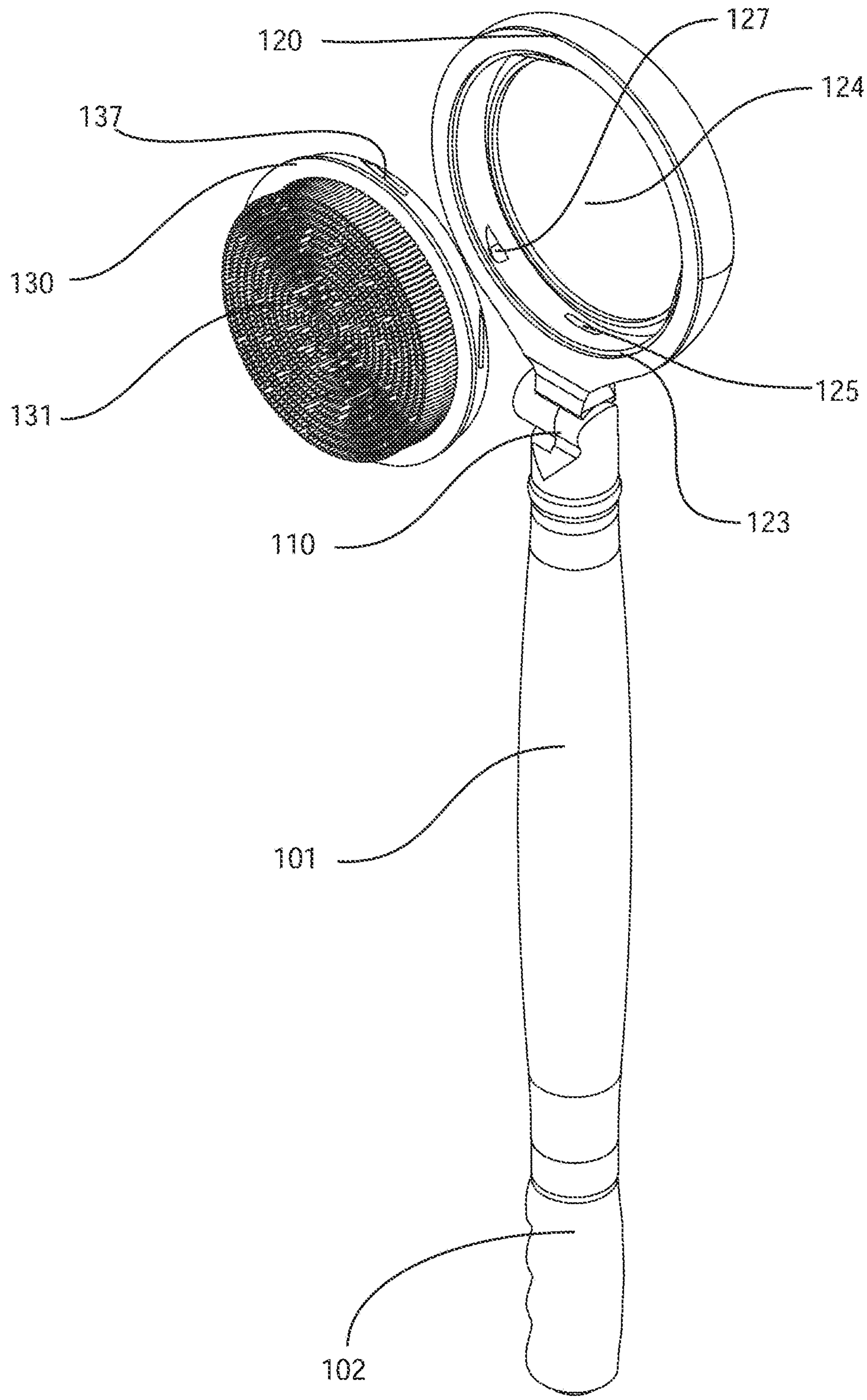
FIG. 12 provides a partially exploded perspective view of an adjustable showerhead attachment, according to an embodiment of the present invention.
Figure 13:
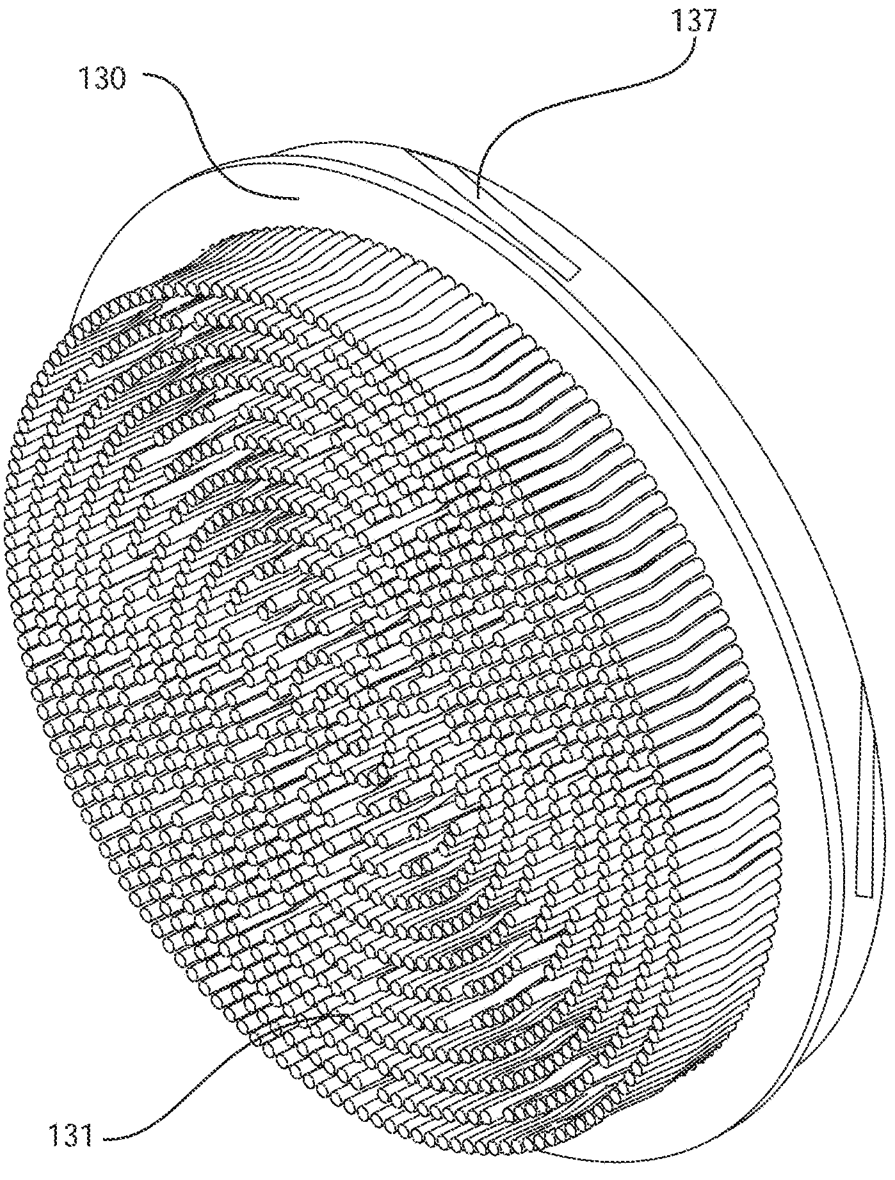
FIG. 13 provides a close up perspective view of an adjustable showerhead insert, according to an embodiment of the present invention.

As illustrated in FIG. 12, an exemplary showerhead 120 may include a fluid tight concentric seal 123, an interior cavity 124, a water outlet 125, and an alignment wedge 127. The showerhead insert 130 may have a channel 137 operable to interface with the alignment wedge 127 when securing to the showerhead 120. The alignment wedge 127 may have a geometry complementary to the channel 137 and there may be a plurality of wedges 127 positioned concentrically around the interior surface of the cavity 124. There may be a plurality of channels 137 positioned around the exterior of the showerhead insert 130 that is operable to concentrically secure the showerhead insert 130 to the showerhead 120.

Figure 11:
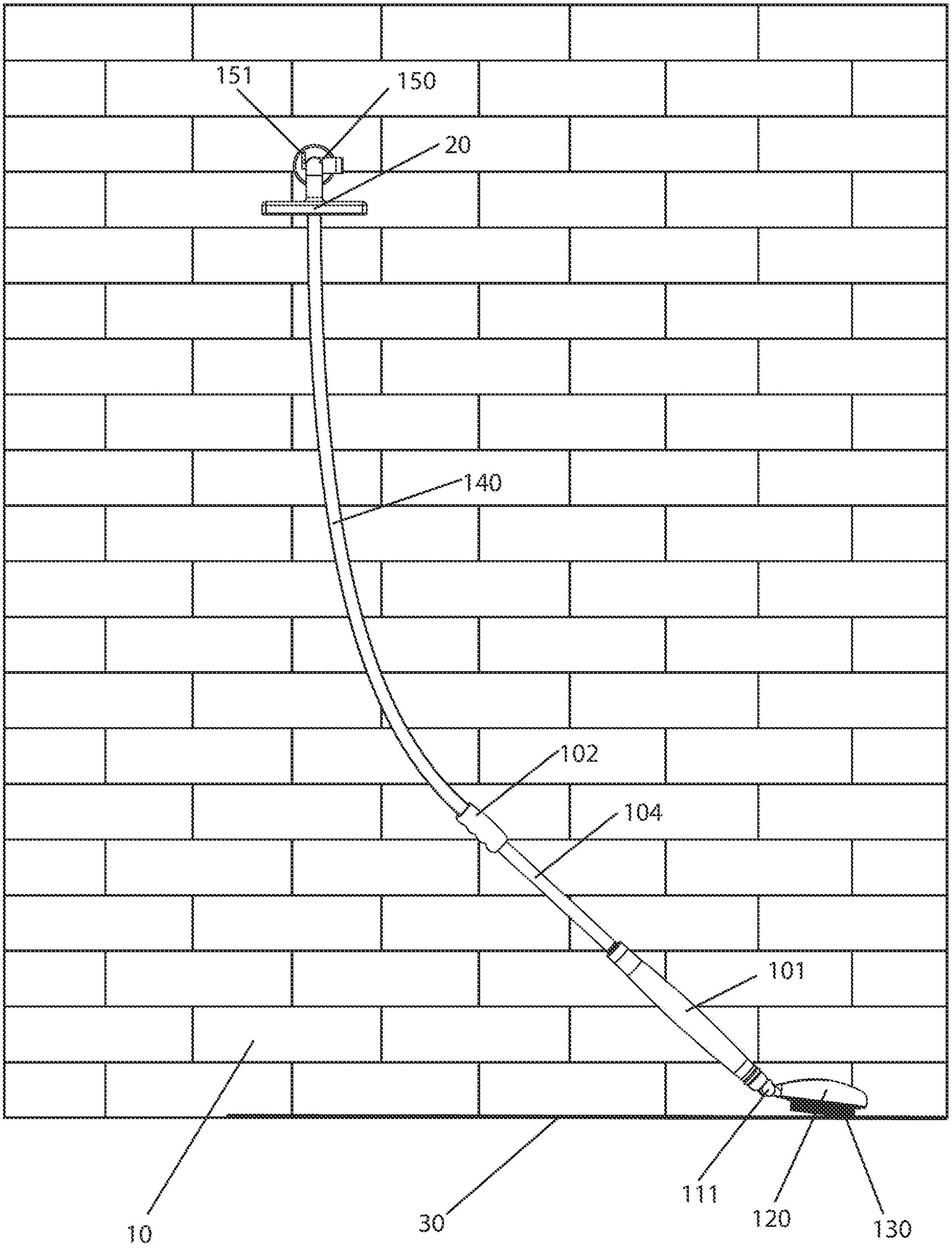
FIG. 11 provides an environmental perspective view of an adjustable showerhead attachment in an extended configuration and incorporated into a fixed showerhead, according to an embodiment of the present invention.
Figure 14:
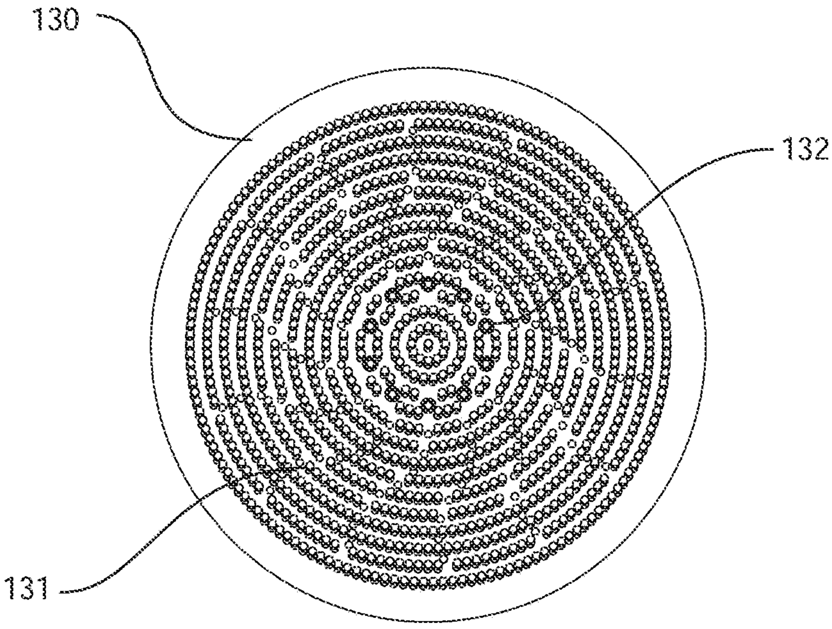
FIG. 14 provides a front view of an adjustable showerhead insert, according to an embodiment of the present invention.
Figure 15:
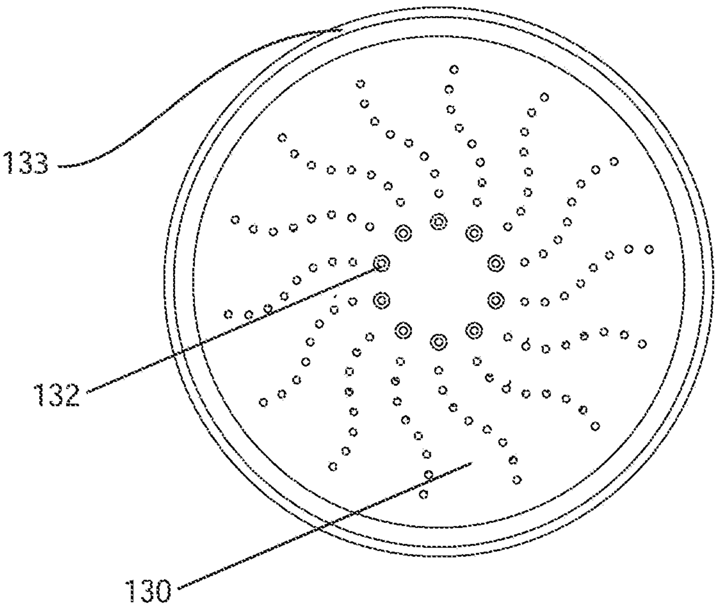
FIG. 15 provides a rear view of an adjustable showerhead insert, according to an embodiment of the present invention.
Figure 16:
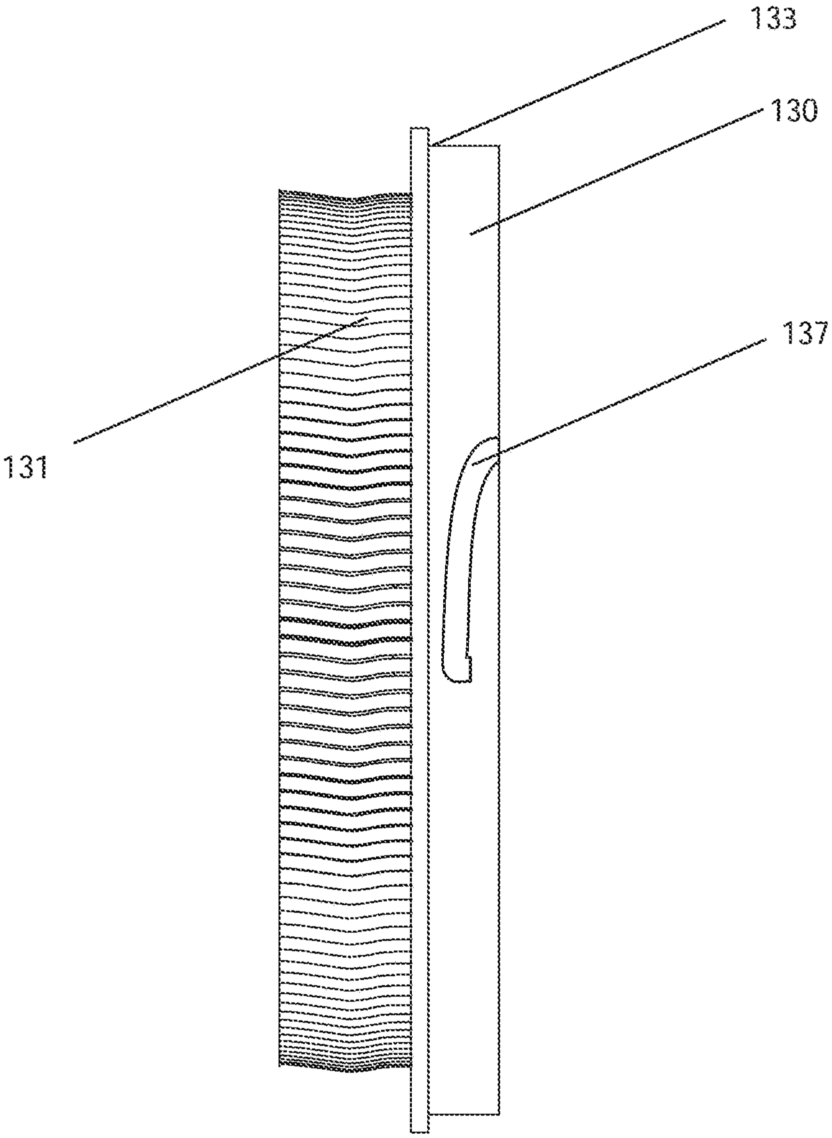
FIG. 16 provides a side view of an adjustable showerhead insert, according to an embodiment of the present invention.
Figure 17:
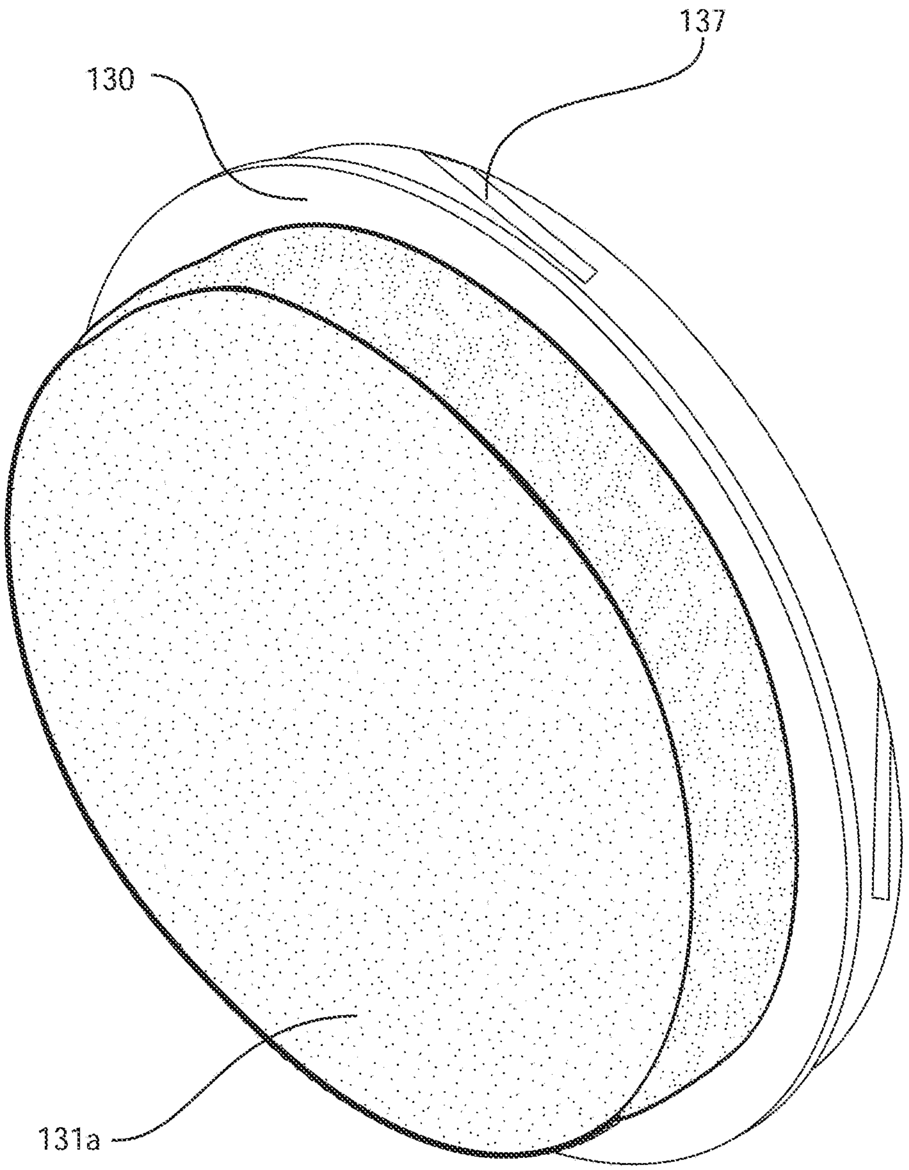
FIG. 17 provides a perspective view of an adjustable showerhead insert, according to an embodiment of the present invention.
Figure 18:
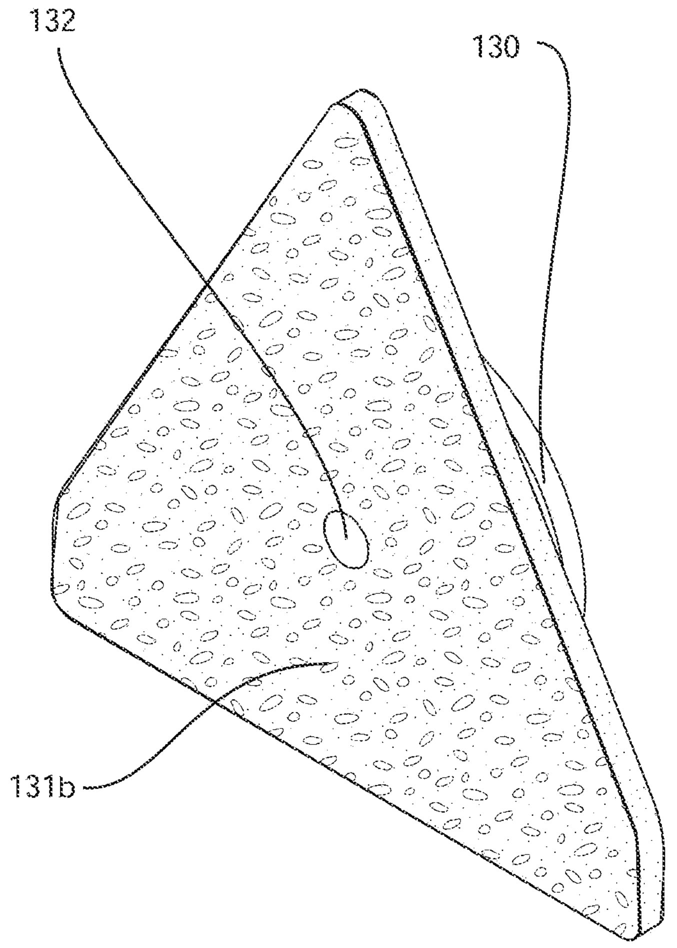
FIG. 18 provides a perspective view of an adjustable showerhead insert, according to an embodiment of the present invention.

In some embodiments, the showerhead insert 130 may be provided with a plurality of different cleaning surfaces that may be used not only to clean a person using the showerhead, but also to clean the walls and floor of the tub or shower where they are deployed. FIG. 11 illustrates an exemplary view of the showerhead attachment 100 in an elongated configuration this has a cleaning brush insert 130 that and locked in a position for cleaning the floors 30. FIGS. 13-18 provide views of different types of brush inserts 130. FIGS. 14-16 provide views of a brush insert having a plurality of individual bristles 131 that are operable distributed over the forward surface of the brush insert and includes a plurality of nozzles 132 operable to distribute water, the exterior edge 133 is operable to interface with the fluid tight concentric seal 123 of the showerhead 120. FIG. 17 provides a perspective view of the brush head 130 having a sponge surface 131*a* that is porous and lightly abrasive for gently cleaning. FIG. 18 provides a perspective view of an alternative cleaning brush insert 130. In this embodiment, the brush insert has a cleaning surface 131*b* and a fluid nozzle 132 in the center of the brush insert 130. The brush insert may have a substantially triangular exterior geometry that provides various surfaces for hard to reach areas such as the corners of a shower or the floor.

Figure 19:
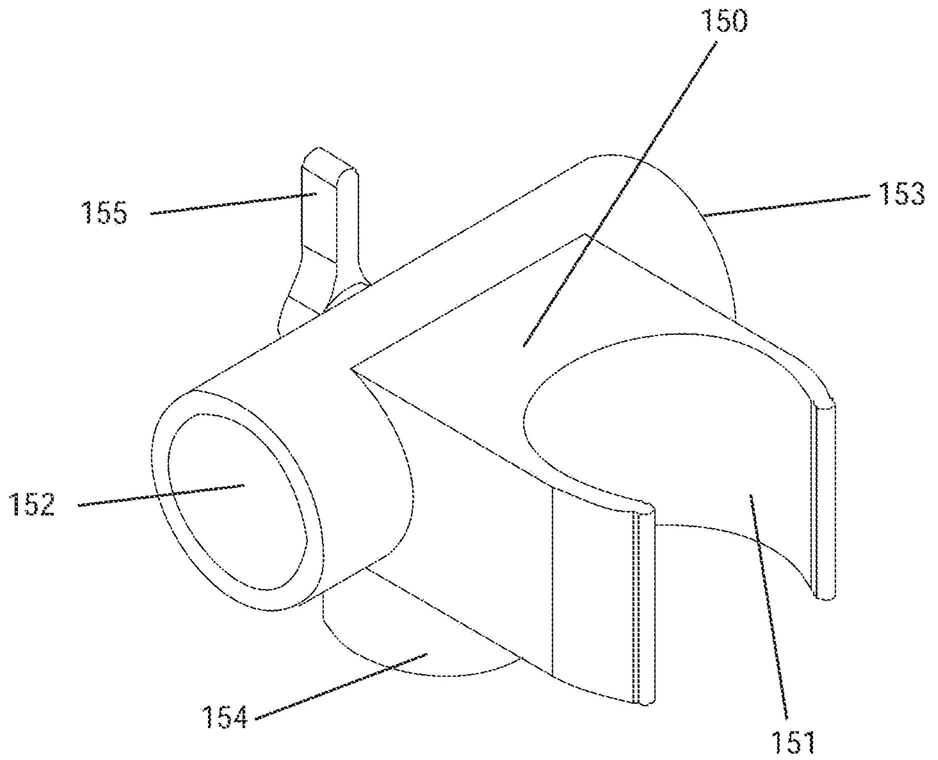
FIG. 19 provides a perspective view of "T" adapter of an adjustable showerhead insert, according to an embodiment of the present invention.
Figure 20:
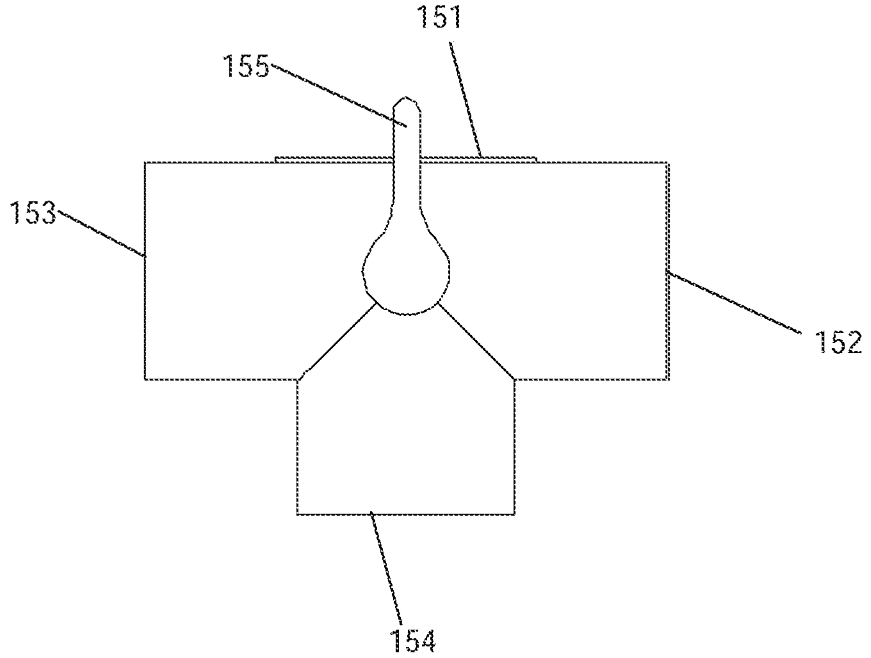
FIG. 20 provides a side view of "T" adapter of an adjustable showerhead insert, according to an embodiment of the present invention.

In some embodiments, as illustrated in FIGS. 19 and 20, the "T" junction 150 may include a main conduit 153, a showerhead connector 152, a lower hose connector 154, a crescent shaped receiver 151, and a switch 155. The main conduit 153 may be operable to secure to the wall or main pipe and the showerhead connector 152 may be operable to secure to the fixed showerhead to the "T" junction 150 and the wall 20, the lower hose connector 154 provides a connection for the hose 140 and the lower handle 102. The crescent shaped receiver 151 may have a geometry complementary to the main handle 101 and a groove 115 on the handle to secure the main handle 101 to the "T" junction 150. The switch 155 may be a valve operable to allow users to disengage and engage the fluid flow through the hose 140 to the showerhead 120.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An adjustable showerhead and brush assembly comprising:

a. an adjustable hollow handle having a fluid passageway therethrough, the handle comprising an upper member for connection to a showerhead and a lower member for connection to a fluid source wherein said upper and lower members are each connected to an intermediate telescoping member that may be extended from or retracted into said upper member;

b. a showerhead pivotally attached to said upper handle member, said showerhead comprising a removable brush insert having an outer cleaning surface with at least one water nozzle opening thereon; and c. a locking member on said showerhead and that is operable to secure the showerhead at a fixed angle with respect to the upper handle member.

2. The apparatus of claim 1 further comprising a flexible hose having one end attached to said lower handle member and an opposite end attached to a T junction at a fluid source in a wall of a shower.

3. The apparatus of claim 2, wherein said removable brush insert comprises a plurality of nozzle openings adjacent to a plurality of bristles on said cleaning surface.

4. The apparatus of claim 3, wherein said showerhead has an interior cavity, water outlet, and a plurality of wedges.

5. The apparatus of claim 3, wherein said removable brush insert includes a plurality of concentric channels around the exterior surface of the removable brush and is operable to align and secure to said showerhead.

6. The apparatus of claim 5, wherein said removable brush insert is secured to said showerhead and has a fluid-tight seal.

7. The apparatus of claim 1, wherein said cleaning surface is substantially triangular and includes a rough scrubbing surface.

8. The apparatus of claim 1, wherein said cleaning surface comprises a sponge having a plurality of nozzle openings therethrough.

9. The apparatus of claim 1, wherein the range of adjustment between said upper handle member and said lower handle member is between about 14 inches and about 30 inches from a base of said lower handle member to a center of said showerhead.

10. An adjustable showerhead device, the device comprising:

a. a handheld brush including a main body that has an extendable and retractable telescopic member and has a lower handle connecting said telescopic member to a hose;

b. a showerhead that is angularly adjustable and attached to a top end of said main body;

c. a T junction that is operable to route fluid from a main pipe to said telescopic member; and d. a brush insert operable to secure to said showerhead, wherein said brush insert includes at least one nozzle and a scrubbing surface;

wherein said brush insert is removable and replaceable and is operable to configure said handheld brush for hygienic cleaning and tile scrubbing.

11. The device of claim 10, wherein said brush insert is removable and replaceable with a plurality of different brush inserts for cleaning various surfaces.

12. The device of claim 10, wherein said handheld shower brush is extended to a maximum length, said showerhead is angularly adjusted to an acute angle, and said at least one nozzle provides water for cleaning a tile surface.

* * * * *